United States Patent [19]

Jeffers et al.

[11] Patent Number: 4,739,510
[45] Date of Patent: Apr. 19, 1988

[54] DIRECT BROADCAST SATELLITE SIGNAL TRANSMISSION SYSTEM

[75] Inventors: John M. Jeffers, Downsview; Donald R. Horne, Don Mills; S. Wayne Mundy, Brampton, all of Canada; Joseph B. Glaab, New Hope, Pa.

[73] Assignee: General Instrument Corp., New York, N.Y.

[21] Appl. No.: 35,262

[22] Filed: Apr. 2, 1987

Related U.S. Application Data

[63] Continuation of Ser. No. 729,290, May 1, 1985, abandoned.

[51] Int. Cl.[4] .............................................. H04N 7/167
[52] U.S. Cl. ........................................ 380/15; 380/19; 380/20; 358/84
[58] Field of Search .................. 380/10, 20, 15, 19; 358/84; 455/2

[56] References Cited

U.S. PATENT DOCUMENTS

| | | | |
|---|---|---|---|
| 4,225,884 | 9/1980 | Block et al. | 358/122 |
| 4,292,650 | 9/1981 | Hendrickson | 358/122 |
| 4,388,643 | 6/1983 | Aminetzah | 358/122 |
| 4,388,645 | 6/1983 | Cox et al. | 358/147 |
| 4,393,404 | 7/1983 | Cox et al. | 358/147 |
| 4,394,687 | 7/1983 | Hutt et al. | 358/147 |
| 4,424,532 | 1/1984 | den Toonder et al. | 358/120 |
| 4,484,217 | 11/1984 | Block et al. | 358/114 |
| 4,531,020 | 7/1985 | Wechselberger et al. | 358/123 |
| 4,531,021 | 7/1985 | Bluestein et al. | 358/122 |
| 4,536,791 | 8/1985 | Campbell | 358/114 |
| 4,575,755 | 3/1986 | Schoeneberger | 358/120 |

OTHER PUBLICATIONS

"Zeitmultiplex analoger Signal-Komponenten für das Satelliter-Fernsehen," *Funk-Technik* 39 (1984), Heft 6, pp. 228-231.
McGowan, Michael J., "Process Bus Protocol Orchestrates Distributed or Centralized Control," *Control Engineering*, September, 1980, pp. 129-132.

*Primary Examiner*—Stephen C. Buczinski
*Assistant Examiner*—Melissa L. Koltak

[57] ABSTRACT

Audio and control signals are digitized and inserted in the horizontal blanking intervals of the distributed composite television signal. The control signals are in the form of a data stream which includes a header containing group address, sync, and program-related information applicable to all receiving units, and a plurality of portions which are addressable to and contain information applicable to the control of particular individual receiving units in the addressed group. The information in the addressable portions can be altered on a real time basis such that the system operator has direct control over certain functions of individual receiving units from the transmission end.

32 Claims, 9 Drawing Sheets

FIG. 5

SUBPACKET (160 BITS)

| | BITS |
|---|---|
| SUBSCRIBER ADDRESS | 8 |
| MESSAGE TYPE | 5 |
| SIGNATURE NUMBER (USED TO SELECT KEY FRAGMENTS FROM SUBSCRIBER SIGNATURE KEY TO DECRYPT FOLLOWING ENCRYPTED MESSAGE | 3 |
| ENCRYPTED MESSAGE | 128 |
| CHECKSUM | 16 |

FIG. 6A

MESSAGE TYPE 1

| | BITS |
|---|---|
| AUTHORIZATION BIT MAP | 32 |
| COMMON AUDIO KEY | 80 |
| HOME CHANNEL | 6 |

FIG. 6B

MESSAGE TYPE 2

| | BITS |
|---|---|
| BLOCKING BIT MAP | 32 |
| CALL IN DAY | 6 |
| CALL IN HR | 6 |
| CALL IN MIN | 16 |
| CREDIT/DEBIT VALUE | 16 |
| TRANSACTION NO. | 8 |
| TELEPHONE PASSWORD | 16 |
| CREDIT CARD PASSWORD | 16 |
| OVERFLOW CALL IN LEVEL | 16 |

FIG. 6C

MESSAGE
TYPE 3

| | BITS |
|---|---|
| CALL IN TELEPHONE NO. | 64 |
| ALTERNATE CALL IN TELEPOHONE NO. | 64 |

FIG. 6D

MESSAGE
TYPE 4

| | BITS |
|---|---|
| CHANNEL ASSIGNMENT TABLE FOR FIRST 8 CHANNELS | 128 |

FIG. 6E

MESSAGE
TYPE 5

| | BITS |
|---|---|
| CHANNEL ASSIGNMENT TABLE FOR SECOND 8 CHANNELS | 128 |

FIG. 6F

MESSAGE TYPE 6

| | BITS |
|---|---|
| DIRECT CONTROL OF 4 DIGIT 7 SEGMENT DISPLAY | 32 |
| CONTROL AND RESET FUNCTIONS | 16 |
| AUDIO THRESHOLD DATA THRESHOLD | 8<br>8 |
| ZIP CODE<br>BLACKOUT MASK<br>BLACKOUT BYTE NO. | 20<br>8<br>2 |
| TRAP MESSAGE BIT MAP FOR PERIPHERAL INTERFACE | 32 |

MESSAGE TYPE 7

| | BITS |
|---|---|
| PERIPHERAL DEVICE SIGNATURE A | 64 |
| PERIPHERAL DEVICE SIGNATURE B | 64 |

FIG. 6G

DIRECT BROADCAST SATELLITE SIGNAL TRANSMISSION SYSTEM

This application is a continuation of application Ser. No. 729,290 filed May 1, 1985 now abandoned.

The present invention relates to video distribution networks and, more particularly, to a reliable, secure transmission system for video, audio, and control signals for use in microwave, cable, and, particularly, in direct broadcast satellite communications.

Direct broadcast satellite services include Pay-TV, tele-conferencing, tele-seminar, private broadcast networks, and the like. The availability of small, low-cost television receive-only terminals in recent years has resulted in an increasing demand for such services. As receive-only television antenna technology improves and the cost of television receive-only terminals decreases, further increases in demand for direct broadcast satellite services are expected.

For this reason, the present invention is described in the context of a direct broadcast satellite system. However, it should be understood that the principles involved are applicable in other types of communications systems such as cable and microwave systems presently in use, as well as to systems of various types being developed.

Unlike land lines and terrestrial microwave links, satellite transmissions lack privacy. Such transmissions can be received by any TV receive-only terminal whose antenna is situated to receive the satellite signals. Accordingly, the secure transmission of video and audio programming and data signals is required to provide the privacy essential to many applications.

A simple example of a direct broadcast satellite network in which security is required is one which broadcasts television signals. Since any receiver having an antenna in the broadcast signal area can receive the satellite signals, it is necessary that the signals be encoded in a way which can be decoded only by subscribers' receiving units. In addition, certain subscribers may have paid for certain programs or program groups, whereas others may have paid for other programs or program groups. The signals must then be further encoded such that subscribers who have paid for particular programs or groups of programs can receive same, while other subscribers cannot.

It may be desirable to design the system such that a particular subscriber can preview a program and then, at that time, decide whether he/she wishes to watch the program and, hence, pay for the privilege. In such an impulse pay-per-view (IPPV) system, the decision of the subscriber must be recorded and communicated to a billing facility for appropriate billing. In such instances, the control signals to the subscriber's receiving unit instructing the unit how to communicate with the billing office must be secure in order to eliminate the possibilities for theft of the service.

The system of the present invention is designed to shift equipment complexity towards the transmitting end of the network, while keeping the receiving equipment inexpensive and reliable. State of the art cryptographic techniques are employed to provide a secure transmission system for the broadcast signals.

The video signal is processed and transmitted in analog form. The audio signal is digitized and transmitted in digital data form. Addressable control data is organized into packets according to address and transmitted in the same digital data form as the audio signals. All of the signals are combined in baseband using time-division-multiplex techniques. The combined baseband signal is modulated and then transmitted over the satellite link to subscribers' receiving units.

This signal structure eliminates the requirement of a sub-carrier for sound and control data, allowing the deviation of the video signal can be increased and video signal-to-noise ratio improved. Moreover, since all of the signals are time multiplexed in baseband, only one FM demodulator is required in the receivers for all signals.

Two audio channels are broadcast. In Pay-TV services, both audio channels may be used for stereo sound broadcasts. In other applications, one of the audio channels may be configured as a data channel for services such as transmission of text, messages, facsimiles, etc.

In general, the transmission end equipment consists of a program processing unit and a real time controller. The program processing unit performs video signal processing and scrambling, audio digitization, encryption of the audio data, and baseband signal time multiplexing. The real time controller generates the audio cryptographic keys, encrypts the addressable control messages, generates the packet messages in accordance with the transmission protocol, maintains the user data base and communicates with other processing units.

The receiving units each include an addressable controller-decoder designed for use with a receiver which has the necessary interface for interaction with the decoder. The addressable controller-decoder demultiplexes the baseband signal, controls the receiver, descrambles the video signal, decrypts the audio data, and converts the audio data into analog form.

The transmitted composite television signal utilizes a format which includes an active video portion and horizontal blanking interval portions. Two digital audio channels and a control data channel are allotted portions of the horizontal blanking intervals. Video frame synchronization information and the zero-level reference are transmitted during the vertical blanking intervals. Audio data and the control data are transmitted in a burst, synchronous mode.

A two-level video scrambling system is used to achieve the best combination of performance, cost, and security. The first level is achieved by removing the line and frame synchronization pulses completely from the video signal. A unique sync word is transmitted in the vertical blanking interval for synchronization purposes.

The addressable controller-decoder establishes synchronization by searching and locating the sync word. Once the sync word is located, all the sync pulses are reconstructed with reference to the sync word. This technique is used in conjunction with video signal inversion, which is the second security level.

In order to avoid picture degradation, the video inversion is performed on a scene-change/frame basis. The sequence of video inversion is controlled by a binary bit stream at the transmitting end. The same bit stream is used to recover the inverted signal at the receiving end. The binary bit stream is derived from a synchronous stream cipher. The key for the stream cipher can vary for each transmission session. The video inversion is controllable at the transmission and can be changed even during a communications session.

For audio digitization, the present invention employs a new delta modulation system developed by Dolby Laboratories of San Francisco which achieves the necessary performance levels. At the same time, this modulation system requires the use of a relatively inexpensive decoder at the receiving end.

Unlike video scrambling, a highly secure audio encryption system can be achieved relatively inexpensively. The decryption circuit, being totally digital, can be implemented using semi-custom or custom integrated circuits. It is highly important that the encryption system employed achieve zero transmission error propagation, that is, one bit in error in the encrypted bit stream results in only one bit in error in the decrypted bit stream.

The present system uses an encryption scheme in which the clear audio bit stream is combined with the bit stream generated by the stream cipher using an exclusive OR operation. The receiving end decrypts the audio bit stream using the same stream cipher bit stream. The stream cipher bit stream is generated by a key (common audio key) and an initializing vector. The common audio key is used for the duration of the communication session and is transmitted in encrypted form through the control data channel. The initializing vector is used for the duration of each frame and is transmitted in the clear form in the horizontal blanking interval.

For further details of the cryptographic techniques employed in the direct broadcast satellite system of the present invention, the reader is referred to co-pending U.S. patent application Ser. No. 665,114 filed Oct. 26, 1984 in the name of Donald Horne and entitled "Cryptographic System For Direct Broadcast Satellite Network", which describes the basic method, and co-pending U.S. patent application Ser. No. 710,385, now U.S. Pat. No. 4,694,491 filed Mar. 11, 1985 in the names of John Jeffers and Donald Horne, entitled "Cryptographic System Using Interchangeable Key Blocks and Selectable Key Fragments", which is directed to certain improvements therein. Both of those applications are assigned to the assignee hereof.

The addressable control data channel carries sensitive information such as audio decryption keys and authorization tier levels. The present system is designed to prevent an eavesdropper from receiving this information correctly and to prevent a legitimate terminal from receiving more information than is authorized. The encryption system utilized in the present invention uses the concept of multiple terminal keys. The common audio key is differently encrypted for use by each receiving terminal. In this way, even in the unlikely event that a decrypting key is compromised, damage can be stopped quickly by deleting the key.

The addressable control data are organized and then encrypted using a key which, in turn, is encrypted with a block cipher algorithm. The length of the block cipher key is 64 bits. When compared with the conventional Data Encryption Standard algorithm, the present block cipher has a larger block and a longer key. Accordingly, brute force attacks on the cipher will take considerably more effort.

One of the important features of the present invention is that it permits real time control over certain functions of the individual receiver units from the transmission end. In general, this is accomplished through the use of an addressable data stream, which forms a part of the composite television signal distributed by satellite. The data stream includes portions which are addressable to and only receivable by a particular receiving unit. Each of the addressable portions contains one of a plurality of different messages. Each message contains instructions to control a function of the addressed receiving unit. For example, a message may advise the addressed receiving unit as to which programming tiers are authorized for viewing on a subscription basis or which programming tiers are eligible for impulse pay-per-view transactions, etc.

Since the information contained in the messages is alterable in real time, the system operator can exercise a great degree of control over the system and, particularly, the operation of the individual receiving units. This makes the system of the present invention more versatile and better able to provide individualized services suitable to particular subscribers.

Another important feature of the present invention relates to the manner in which the receiving unit captures and uses the control data to process and reconstruct the video and audio information. The composite television signal contains information relating to a plurality of channels or tiers of programming, each on a different frequency. The signal associated with each frequency contains video information, encrypted audio information, and an addressable data stream including header portions and groups of addressable portions associated with each header.

When a program is selected, the corresponding frequency is tuned and the video and audio information is separated from the data stream. Each header contains sync information, group address and information relating to the selected program. This information is used by all receiving units. Each addressable portion contains a unit address and control information for the addressed receiving unit only or a group address and control information for all receiving units in the addressed group.

Each header is examined and the information therein, including program-related information, sync information and impulse pay-per-view information, is captured and stored. If the header includes a group address matching the receiving unit group address, indicating that an addressable packet may be present which is addressed to the receiving unit, each addressable portion is examined in turn. After the addressable portions are all examined, the next header will be monitored.

When an addressable portion is encountered which includes a global address or the address of the receiving unit, the control information therein is captured. The control information is in the form of a message, as indicated above.

The message is usually in encrypted form. The addressed portion contains information which, when used in conjunction with information stored in the receiving unit, is used to decrypt the message.

The control information and program-related information are stored for use in processing and reconstruction of the video and audio information for display. Depending upon whether the program selected is within the subscription or can be viewed only on a pay-per-view basis, the subscriber may have to enter the necessary commands into the receiving unit to obtain the display.

It is, therefore, a prime object of the present invention to provide a reliable, secure transmission system for video, audio, and control signals in a communications system.

It is another object of the present invention to provide a direct-broadcast satellite signal transmission system which utilizes an addressable data stream inserted into the horizontal blanking intervals.

It is another object of the present invention to provide a direct-broadcast satellite signal transmission system wherein the addressable data stream is organized in a header packet followed by a plurality of addressable packets.

It is another object of the present invention to provide a direct-broadcast satellite signal transmission system wherein the information in the addressable packets in the data stream can be altered on a real time basis.

It is another object of the present invention to provide a direct-broadcast satellite signal transmission system wherein the header packet in the data stream receivable by all receiving units contains synchronizing information, data related to the programs being broadcast, and impulse pay-per-view data related to the programs being broadcast.

It is another object of the present invention to provide a direct-broadcast satellite signal transmission system wherein the addressable packets in the data stream decodable only by the addressed receiving unit controls individual subscriber authorization, encryption key distribution, pay-per-view transactions, channel frequency re-assignment, and provides direct control over other functions of the addressed receiving unit and the display associated therewith.

It is another object of the present invention to provide a direct-broadcast satellite signal transmission system wherein the addressable packets in the data stream control the interface with receiver peripheral devices.

In accordance with one aspect of the present invention, a method is provided for transmitting data in a communications system of the type including broadcast signal originating means, a plurality of broadcast signal receiving means, and means for distributing the broadcast signal from the originating means to each receiving means. The method comprises the steps of generating a broadcast signal having active video signal portions and horizontal blanking portions. A an audio signal and a data stream are generated and inserted into the horizontal blanking portions. The data stream includes a header portion including group address information and program-related information applicable to all of the receiving means and groups of addressable portions associated with the header. The addressable portions include information for addressing a particular one (or all, if a global address) of the receiving units in the addressed group and for the control of the functioning thereof.

The method further comprises the steps of selecting addressable portions and altering the information therein. This permits individual receivers to be controlled at the transmission end on a real time basis.

The information in the header includes information relating to the active video portion of the broadcast signal. For example, this information may include video synchronization information and program identification information. It may also be related to audio descrambling and may include audio decryption information. This information may, in addition, include impulse pay-per-view data.

Each of the receiving means is assigned a unique digital address including most significant bits (group address) and least significant bits (subscriber unit address). The information in the header includes the most significant bits of the digital address. The information in the addressable portions includes the least significant bits of the address for the particular receiving means to which the addressable portion relates. All units can be accessed simultaneously through the use of a global subscriber address.

The information in each of the addressable portions includes a selected one of a plurality of encrypted receiver message types. In addition, information for decrypting the selected message type is included, as is an indication of the type of message.

For example, one type of message may include program authorization data and instructions to store same, as well as additional audio decryption data. It may also include data representative of a "home channel" which is to be selected when the decoder is in the quiescent mode.

Each of the receiving units may be provided with telephone communication capability with the originating means. In this case, one of the message types may include impulse pay-per-view transaction data, identification data, call time data, and program value data. Also included may be program tier blocking data and telephone call-in number data. Other message types may include channel reassignment tables for use in case a particular program channel must be broadcast on a normally unused frequency due to transponder failure.

The information in the addressable portions may also include message types which comprise display control data in order to control the digital displays of the various receiving units, erase and reset control function data for the operation of the receiving unit, program blackout data, and audio and data threshold data.

In some instances, the receiving units are used in conjunction with one or more peripheral devices for processing, recording, or displaying broadcasting signal information. One message type may include peripheral device data. Another message type may include peripheral device selection data.

One of the advantages of the present system is that an error in the information in one of the addressable portions is not processed by receiving units other than the particular receiving units to which the error containing addressable portion relates. Thus, an error does not disrupt the function of the system—only the function of a particular receiving unit in the system.

In accordance with another aspect of the present invention, a method is provided for processing data received in a broadcast signal of the type including active video signal portions and horizontal blanking portions. The horizontal blanking portions include an encrypted audio data portion and a data stream. The data stream includes a header portion containing information applicable to all the receiving units, including group address data, signal synchronization data, and audio decryption data of a first type, and a plurality of addressable portions, each containing information applicable to the control of a particular addressed receiving unit in the addressed group, and including unit address data, encrypted message data, and message decrypting data. The method includes the steps of determining whether the group address data matches the group address of the receiving unit, processing the header information to obtain synchronization data for the video portion of the broadcast signal, and audio decryption data of the first type. If the group address matches, each addressable portion is tested, in sequence, to determine whether the received unit address contained therein matches the address of the receiving unit. Information in the addressable portion with the matching receiving unit address is processed to obtain and decrypt the encrypted message data. The message data contains a second type of audio decryption data. The audio decryption data of the first and second types is used to decrypt the audio signal data.

In accordance with another aspect of the present invention, a receiving unit for use in a communication system is provided. The communication system is of the type which transmits a signal comprising video and audio information for a program, a header portion containing a group address, sync information, and information relating to the program, and a plurality of addressable portions associated with the header portion. The addressable portions contain information relating to the control of individual addressed receiving units in the addressed group. The receiving unit comprises a means for receiving the signal and means for selecting a program to be viewed. Means are provided for tuning the frequency of the selected program. Means are provided for separating the portions from the video and audio information and for examining the header portion to determine if the receiving unit is within the addressed group. Means are provided for capturing and storing the header information. Means are provided for examining each addressed portion to determine if the receiving unit is within the addressed group. Means are provided for capturing and storing the control information in the addressed portion if the receiving unit is addressed. Means are also provided for processing and displaying the video and audio information in accordance with the stored header and control information.

The audio information is in encrypted form. The control information comprises audio decryption information. The processing and display means preferably comprises means for decrypting the audio information in accordance with the audio decryption information captured from a portion addressed to the receiving unit.

Each of the addressed portions contains a message. The means for capturing and storing the control information comprises means for capturing the message. The message is transmitted in encrypted form. The addressed portion further comprises information for decrypting the message. The receiving unit further comprises means for decrypting the message using the decrypting information in the portion.

Means are provided for storing message decrypting information. Means are provided for using the stored message decryption information and the decryption information in the addressed portion to decrypt the message.

One of the addressed portions may contain control information addressed to all of the receiving units in the addressed group. The receiving unit further comprises means for capturing and storing the control information in such globally addressed portions if the receiving unit is one of the addressed groups.

To these and to such other objects which may hereinafter appear, the present invention relates to a direct broadcast satellite signal transmission system, as set forth in detail in the following specification and recited in the annexed claims, taken together with the accompanying drawings, wherein like numerals refer to like parts and in which:

FIG. 1 is a block diagram of the overall system of the present invention;

FIGS. 2A and 2B, taken together, for a block diagram of the addressable controller decoder which forms a part of the receiving unit of the present invention;

FIG. 5 illustrates the composition of a typical addressable portion of the data stream used in the system of the present invention;

Figure 7:
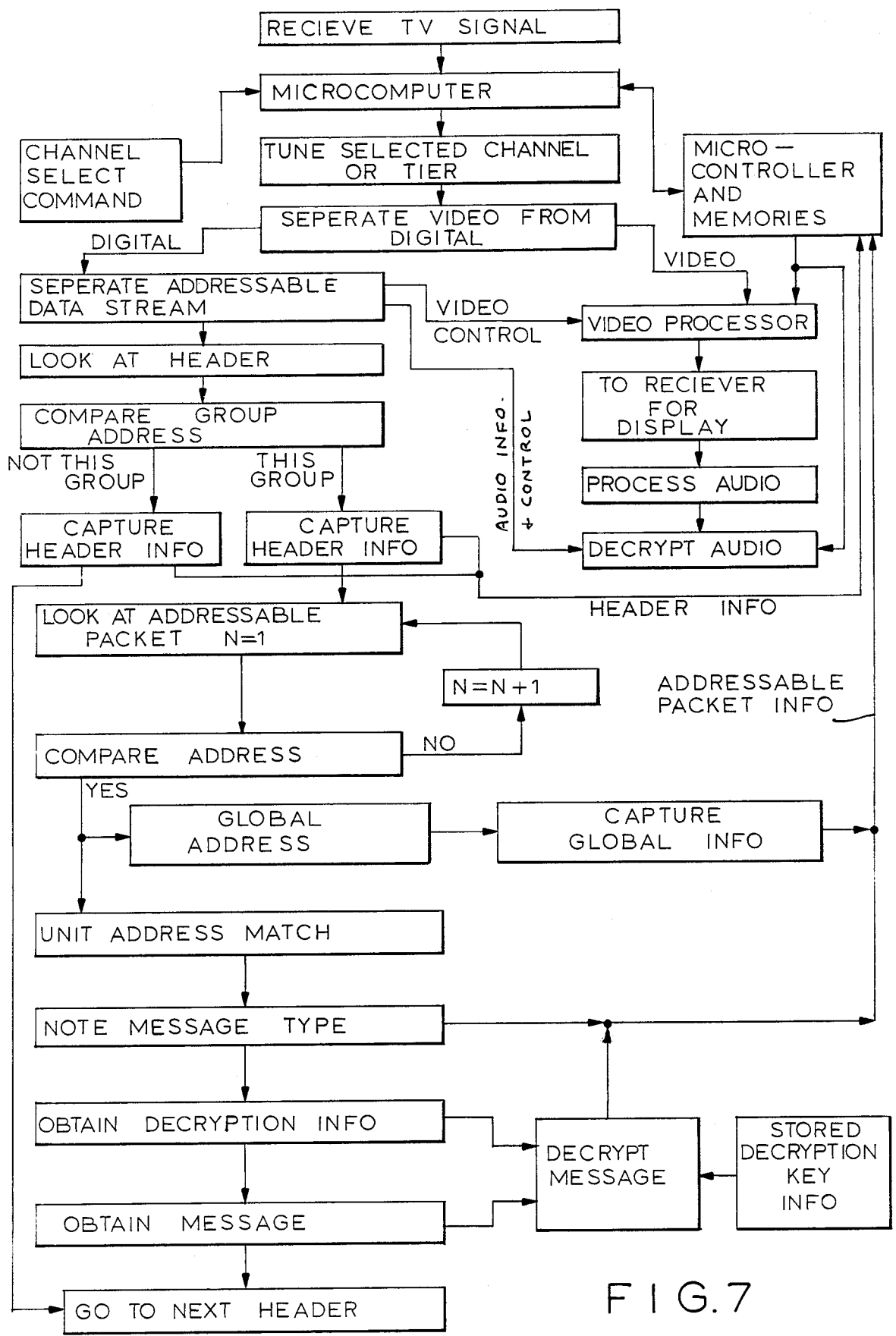

FIGS. 6A, 6B, 6C, 6D, 6E, 6F, and 6G each illustrate the composition of a message type distributed through an addressable portion of the data stream of the present invention; and FIG. 7 is a flow chart illustrating the various functions of the receiving unit in capturing information from the composite signal and processing same.

Figure 1:
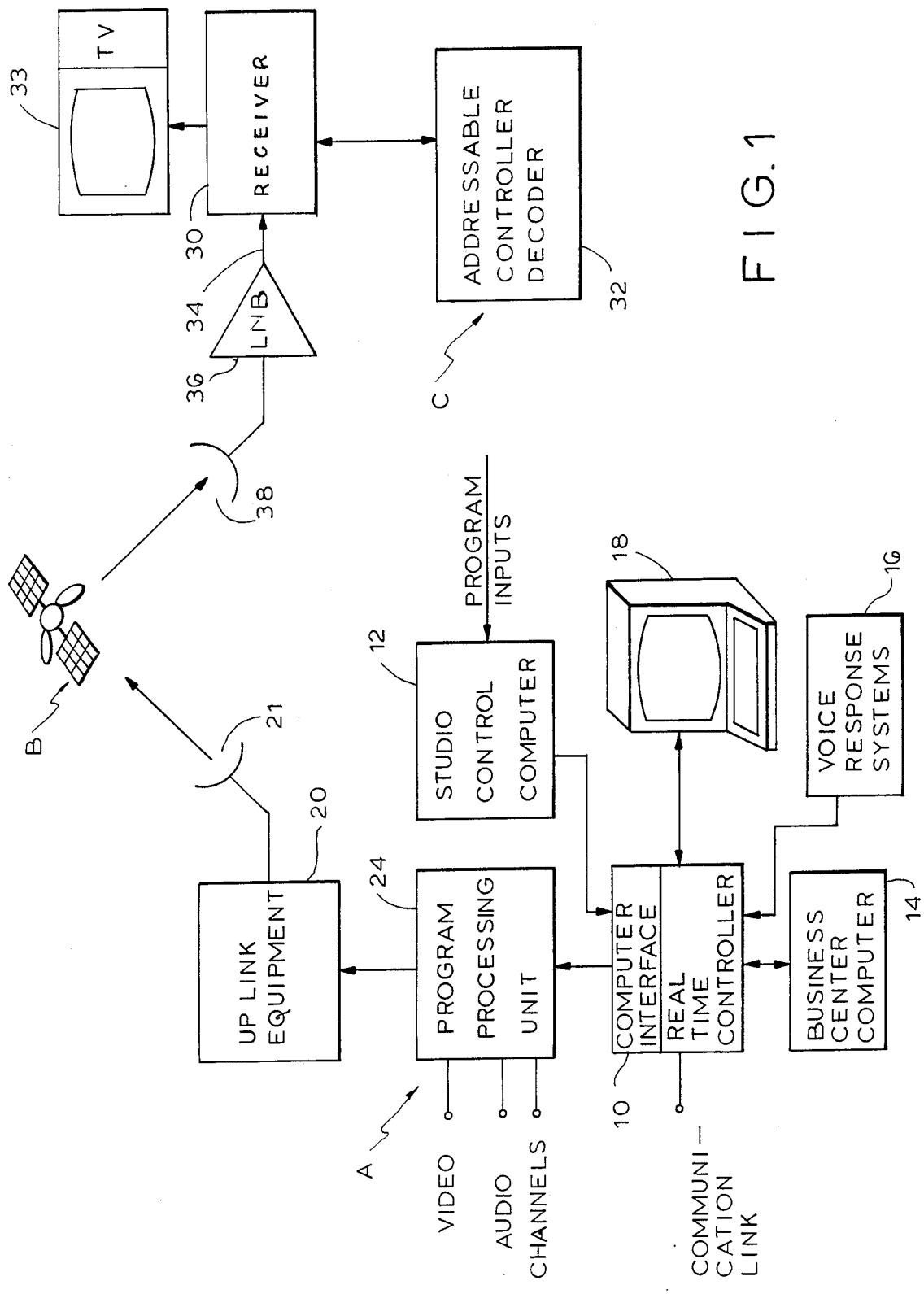

FIG. 1 shows, in block diagram form, an overview of direct broadcast satellite network utilizing the signal transmission system of the present invention. The network includes a transmission or head end, generally designated A, a satellite including a plurality of signal transponders, generally designated B, and one of a plurality of receiving units or terminals, generally designated C. Signals originating at transmission end A are transferred to satellite B and, thereafter, distributed to a plurality of receiving units C located within the signal broadcast area.

The system is capable of supporting in excess of 16 million individual subscribers and a plurality of active program channels and tiers. A real time controller 10 accepts real time inputs from a studio control computer 12 which are time locked to the start of program content being received from each of the ten program inputs. Each program input is time base corrected standard video and may have monaural, bilingual, or stereo baseband audio associated with the program.

The real time controller 10 also receives data inputs from a business center computer 14 which manages the customer data base and, from a voice response system 16 which is used by field service personnel or authorized contractors. In addition, real time controller 10 accepts inputs from the head end operator console 18.

The head end equipment accepts a program input from the studio. It scrambles the video and encrypts the audio. It then provides a scrambled video program with integral data and encrypted audio to the up-link equipment 20. The up-link equipment 20, in turn, transfers the signals to satellite B by means of antenna 21.

The primary function of the real time controller 10 is to generate an addressing data stream which is routed through a computer interface module which forms a part of controller 10, to a program processing unit 24. In the program processing unit 24, the addressing data stream is inserted in the horizontal blanking interval of the video signal.

The real time controller 10 stores, in disc memory, addressable controller decoder authorization lists and impulse pay-per-view information expandable up to 16 million decoders. This information is passed to the different program channels.

The real time controller 10 also provides routine display of system program content, with menu driven options for systems status, statistics and changes to both system parameters and stored information, to a remote console connected by communications link and locally to a head end operator console 18. The operational system includes a console printer (not shown) for the system in addition to the color video display terminal for the head end operator.

The computer interface module in the real time controller 10 provides the program processing unit 24 with a plurality of operating channels and two spare channels. Each spare channel can be used in place of any of the operating channels, should one of these fail. This is accomplished automatically within the real time controller 10. The programming processing unit provides the channels to the up-link equipment 20 which, in turn, is connected to antenna 21.

The system is designed to permit monitoring by an operator both locally or remotely. Head end operator terminal 18 and a remote operator terminal are provided, respectively, for these purposes.

Security scrambling of the video signal is accomplished by the elimination of the synchronization pulse and inversion of the video signal on a controlled basis. The program processor unit 24 is the actual scrambler portion of the head end A. Video synchronization elimination is achieved through the removal of the horizontal sync portion of the video signal. Video inversion is achieved through electronic inversion of the video signal.

Audio encryption is achieved by digitizing the dual audio channels and subjecting them to a key-based encryption algorithm. The encrypted digital audio bits are then merged with the control data. The resulting digital bit stream is placed in the horizontal blanking intervals of the broadcast video signal for transmission over the satellite link. The program processing unit 24 interfaces with the real time controller 10 via the computer interface module. The real time controller 10 has the ability to alter the control data on a real time basis so as to control the function of particular receiver units.

The subscriber receiving unit or terminal end C of the network, one of which is schematically illustrated in FIG. 1, includes a receiver 30 interconnected with an addressable controller decoder 32 and a television 33. The receiver 30 is connected by means of a cable 34 with a low noise block converter feed 36 which forms a portion of an antenna 38 mounted on the roof of the building. Receiver 30 and decoder 32 are structurally and functionally described in co-pending U.S. patent application Ser. No. 548,357, filed Nov. 3, 1983 and entitled "Receiver With Interface For Interaction With Controllable Decoder", in the names of Ashok George and John Jeffers, and owned by the assignee hereof. The reader is referred to that application for a more detailed description of the operation of the receiver and the controller.

In general, the receiver includes a circuit for tuning a given signal from the received signals and for modulating the tuned signal for viewing. A keyboard input is provided for generating input command signals in response to the actuation thereof. A display is provided to display indicia representative of the various functions of the receiver.

A control circuit is operably connected to the input keyboard for receiving input command signals therefrom and for controlling the tuning circuit and display circuit. The control circuit is capable of generating and receiving data signals relating to the function of the tuning circuit and the display circuit. An interface is operably connected to the control circuit and to the addressable controller decoder 32 for bidirectional data signal transfer therebetween.

The control circuit generates a synchronizing signal and transfers the synchronizing signal to the decoder. The control circuit then waits a given period to receive a data signal from the decoder. The control circuit will then generate a data signal to initiate communication with the decoder if no data signal is received from the decoder during the waiting period.

The control circuit includes a memory for storing information relating to the tuning circuit and the display circuit. The control circuit includes means for accessing the memory, obtaining the information therein and for converting same into a data signal.

If a data signal is received by the receiver from the decoder during the waiting period the data signal is first stored in a memory. A circuit is provided for converting the received data signal into a form suitable for storage. The stored information is thereafter used by the receiver to control the functions of the tuning circuit and the display circuit.

The data signal from the decoder may be a command to the receiver to generate a particular data signal in response. For example, to advise the decoder as to the frequency to which the tuning circuit is tuned. After the response, the decoder may then return a data signal containing a command for the receiver to perform a specific function. For example, cause the tuning circuit to tune to a different frequency for channel relocation. The data signal which is transferred from the decoder to the receiver control circuit may alternatively include data words which are representative of a command to set the tuning circuit in response to a pay-per-view transaction, a command to set the display circuit, or a command to ignore a particular input command.

The data signal generated by the receiver control circuit may include data words which represent the input commands or the status of the display circuit or of the tuning circuit. These data words are used in the decoder as information in formulating the return data signal.

Each of the data signals includes a data word including a start portion, a data portion, and a termination portion. The data signal transfer is normally initiated by the receiver control circuit and, in particular, by the generation of a synchronization word by the control circuit and the transfer of same to the decoder through the interface.

Data signal reception by the control circuit occurs only when a data signal from the decoder is received within a given wait period after the generation of the synchronization word. Data transfer from the control circuit can commence subsequent to the wait period, if no data signal from the decoder is received within the wait period.

The data words generated by the control circuit are separated from each other by a waiting period during which receipt of the data signals from the decoder is possible. Thus, a particular serial communication protocol must be followed for the transfer of the data signals between the receiver and the decoder.

In addition to the normal subscription service paid for by and provided to the subscriber, the receiver may permit the subscriber to directly authorize the decoder to descramble a program which is not within the normal subscription service. This is called an impulse pay-per-view transaction and is accomplished when the subscriber presses the correct sequence of keys on the keyboard input. The time window during which the subscriber may sign up to view a program is set by the system operator and consists of a preview time and the actual time of the show. All users may have the same preview time period at the beginning of the program, or the preview time can be a certain time after the user tunes to the program.

The subscriber is notified that a program is available for authorization when the subscriber tunes to the particular program during the preview time or show time. If the subscriber enters the necessary authorization information, the program will be descrambled so that it can be viewed.

The decoder provides the subscriber with a method for preventing unauthorized viewing of the scrambled programs. The subscriber has the option of recording a unique pass code which will then be required to authorize the viewing of an impulse pay-per-view program. The password is entered into the receiver keyboard and is transferred to and stored in the decoder in a non-volatile RAM (Random Access Memory). Thereafter, the pass code must be entered into the receiver to view a scrambled event.

The receiving unit also has a control capability which allows program blocking as selected either by the system operator or locally by the subscriber, this being provided by the addressable controller decoder when it is connected to the receiver. The broadcast signals contain a plurality of levels of programming called tiers. If a program is selected which is not suitable for family viewing, that is, is under the local control function, the channel number will be displayed on the display with the appropriate indication of the control function. The picture will be scrambled and the audio silent. In order to view this program, the subscriber must enter the necessary control pass code in order to view the program. If the appropriate local control password is not entered, the program will not be descrambled and cannot be viewed.

A control function may also be exercised by the system operator. From the transmission end, the operator may choose to block entirely the viewing of any tier by a particular subscriber. For a description of how this is accomplished, the reader is referred to co-pending U.S. patent application Ser. No. 710,466 filed Mar. 11, 1985 by Donald R. Horne, entitled: "Program Blocking Method For Use in Direct Broadcast Satellite System", and assigned to the assignee hereof.

The subscriber makes a choice of which programming tiers to pay for by subscription. All other tiers are paid for on an "as viewed" basis. Program tiers which are part of the subscription are stored on an authorization list in the decoder. If any program tier matches a tier in the authorization list, the program may be viewed. If not, the display indicates that the program on the selected tier must be paid for and the subscriber may proceed to preview and pay for the program if desired. If the program is on a tier which appears on the "blocking" list, it cannot be viewed.

The authorization list and blocking list are under the control of the system operator and can be altered on a real time basis. Thus, the system operator can change these lists whenever necessary or desirable.

The receiver system has a channel relocation feature which is a method by which the system operator may provide dynamic channel relocation to deal with problems such as interference to the satellite signal or a malfunction of a particular transponder in the satellite, such that a particular program must be broadcast on a different frequency than usual. In order to do this, the decoder will see if the channel selected is in the relocation table. If it is, the receiver is told by the decoder to change the channel frequency. Up to 16 channels may be placed in this table by the programming originator and may be changed at various times.

The low noise block converter 26 accepts a 12 GHz signal at its input. The signals are amplified and mixed with a signal generated by an oscillator. The resulting signals are ultra-high frequency signals which are sent to the input tuning section of the receiver 30 by co-axial cable 34.

Aside from the tuning section, the receiver includes an input/output section, a control section which includes the data communications interface, and a signal modulation section. All of these sections and the components therein are of conventional design, except for certain portions of the receiver tuning means, control means, and serial buffer described in the above-identified application Ser. No. 548,357.

As described in detail in U.S. application Ser. No. 548,357, the tuner section includes a band pass filter which is connected to the input of a mixer. The other input of the mixer is fed by a circuit which sets the intermediate frequency. This circuit includes a multiplication circuit. The input to the mixer circuit is connected to the output of a voltage controlled oscillator. The voltage controlled oscillator is controlled by the output of a charge pump located in the control section of the receiver. The output of the voltage controlled oscillator also forms the input to a divider circuit which, in turn, is connected to the input of an electronic switch in the control portion of the receiver.

The output of the mixer is connected through an intermediate frequency amplifier to the input of an automatic gain control circuit. The output of the automatic gain control circuit passes through a band pass filter to a detector. The detector is connected, by means of a feedback loop, to the input of the AGC circuit.

The other output of the detector is connected to an FM detection circuit. The FM detector circuit is a phase locked loop of well known design and provides the base band signal. The FM detection circuit includes a mixer hich is connected to the output of a second oltage controlled oscillator. The output of the second voltage controlled oscillator is also connected by a divider circuit to the input of the electronic switch. This divider output is used for the automatic fine tuning of the receiver.

The input/output section of the receiver includes a power supply circuit designed for connection to an AC line cord and includes a non-switched AC output. An AC relay circuit, controlled by a microprocessor, provides a switched AC output.

The receiver is provided with a keyboard circuit connected to a keyboard encoder. A remote keyboard may also be provided on an infrared transmitter. The signal from the IR transmitter is received at an infrared pre-amplifier circuit. The output of the infrared pre-amplifier circuit and the output of the keyboard encoder are fed to the input of the microcomputer.

The microcomputer is connected to a LED display circuit. It displays the selected channel number, the time (as generated by a clock within the microcomputer), and other indicia relating to the operation of the receiver and requests for authorization to descramble certain programs.

The output of the microcomputer is connected by a parallel bus to a digital-to-analog converter which, in turn, provides the input to a volume control circuit. A mixer receives the descrambled audio from the decoder on two separate channels which will provide stereo or bilingual audio. The output of the mixer circuit is transferred through the volume control circuit to a TV modulator. The TV modulator receives the descrambled video signal from the decoder and generates an output to an RF switch which will provide the necessary signals to the television set for viewing the descrambled program.

The receiver and, more particularly, the microcomputer thereof communicates with the decoder through a serial buffer in the interface circuit. The serial buffer permits bidirectional data signal transfer between the microcomputer of the receiver and the microcontroller which regulates the operations of the decoder.

Figure 2A:
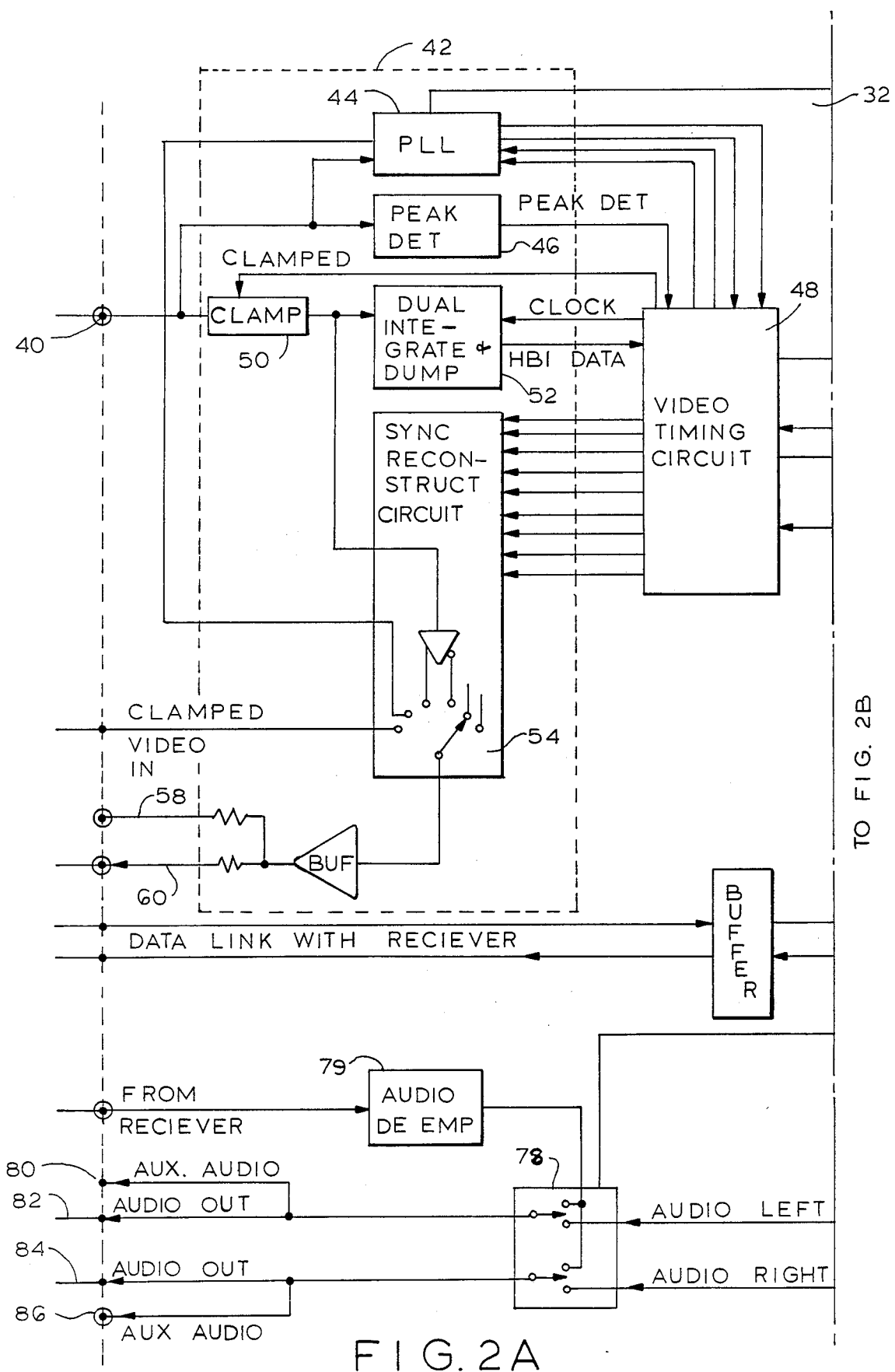
Figure 2B:
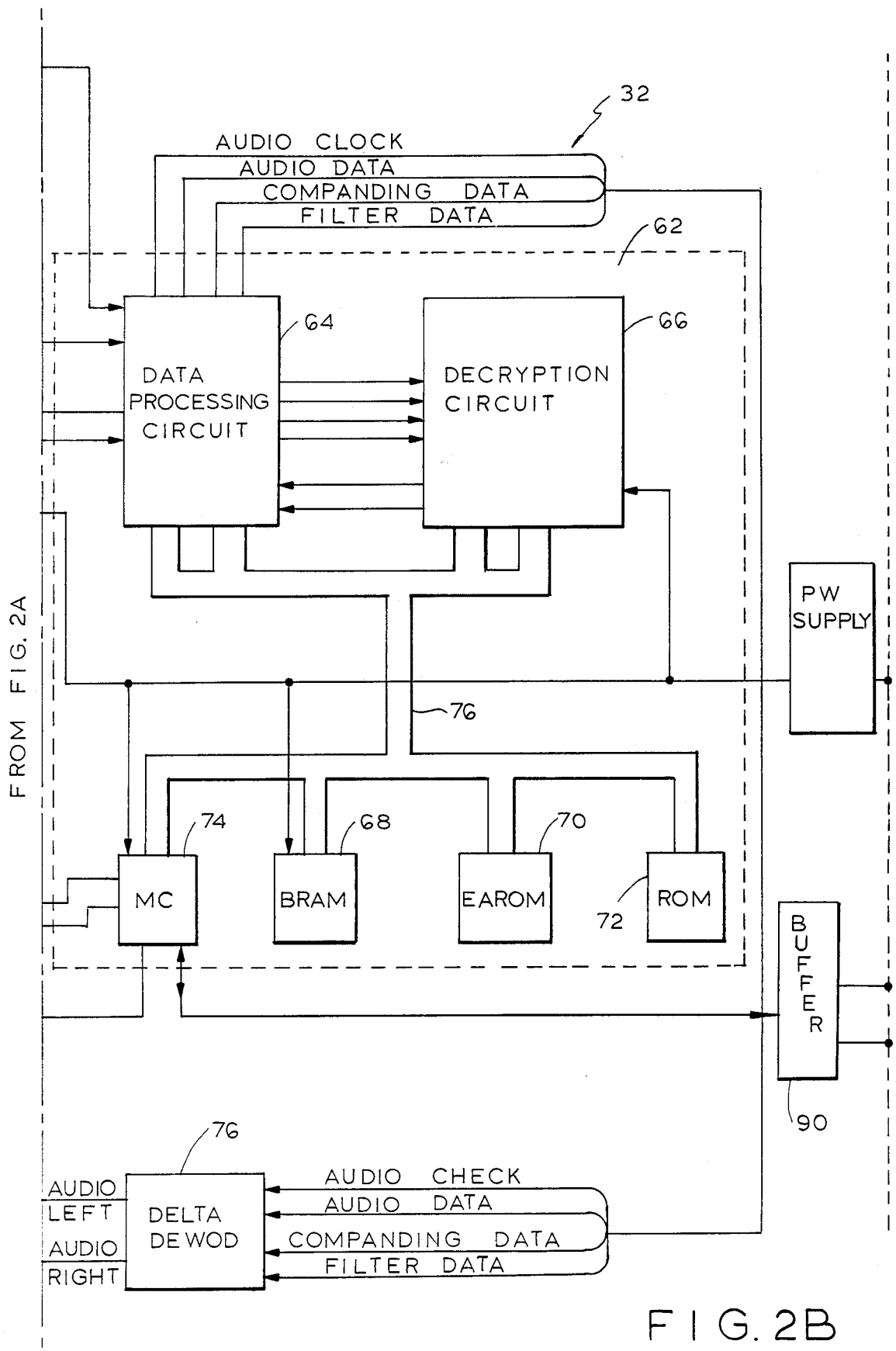

FIGS. 2A and 2B comprise a block diagram representation of the addressable controller decoder 32. The baseband signal from receiver 30 is applied at input 40 and is passed to a video control circuit 42 where the data stream is used to control the reconstruction of the video signal. The video control circuit 42 includes a phase locked loop clock 44 and a peak detector circuit 46, both of which are connected to a video timing circuit 48. A video clamping circuit 50 receives a clamp gate signal from video timing circuit 48 and feeds a dual integrate and dump circuit 52 as well as the switch 54 portion of a sync reconstruct circuit 56. The reconstructed and clamped video signal is passed through switch 56 and then sent to the video out connectors 58, 60 on the rear of the decoder.

The video control circuit 42 examines the vertical blanking interval for line reference information, black level, and sync tip values. From this information, plus information carried in the horizontal blanking intervals, the video control circuit 42 interacts with the clock 44 and the video timing circuit 48 to completely reconstruct a clamped video signal which is passed to the video switch 54. The video control circuit 42 will provide entertainment quality video signals at received signal levels above threshold. The digital bit stream in the horizontal blanking intervals of the baseband signal is passed to the video timing circuit 48.

The video timing circuit 48 interfaces with clock 44 and the video control circuit 42 to insure that the decoder is fully synchronized with the incoming video signal. The video timing circuit 48 also performs error correction on the digital bit stream using error correction techniques. The digital bit stream is then passed onto the digital processing circuit 62 which includes a data processing circuit 64, a decryption circuit 66, various memories 68, 70, and 72, and a microcontroller 74.

The data processing circuit 64 accepts the error corrected digital bit stream (including the data stream and encrypted audio). The data stream portion of the digital bit stream is converted from serial to parallel and passed to a microcontroller data bus 76. The encrypted audio portion of the digital bit stream is buffered and passed to the audio decryption circuit 66 in serial form. Information about video inversion and audio format are passed to a control and status circuit within microcontroller 74.

Using the common audio key information present in an encrypted message in the data stream, which message is decrypted using the subscriber unit signature key stored in memory 70, audio is decrypted into clear interleaved bits. The decryption circuit passes a buffered regular stream of audio bits to the data processing circuit 64 which passes the audio data, along with clock signals, companding data, and filter data to the delta modulators 76.

The delta demodulators 76 are used to convert the two digital audio bit streams into analog voltages resembling the original audio sources. Two separate audio channels are provided for either stereo, audio, or dual language programs. The two audio channels are then passed to the receiver via the audio switch 78 controlled by audio deemphasis circuit 79 and audio out and audio auxiliary connectors 80, 82, and 84, 86. Control logic for this process is derived from the control and status circuit within the microcontroller 74. Using noise reduction techniques, the delta demodulators 76 provide entertainment quality audio at received signal levels above threshold.

The control and status circuit in microcontroller 74 controls the delta demodulators 76 to provide the various audio output configurations. This circuit also extracts video inversion and provides information to the video control circuit to pass or invert the video signal.

The microcontroller 74 is the controlling device within the decoder. All of the major functional blocks are peripherals to microcontroller 74 including receiver 30. Microcontroller 74 is continually updating all information and stores subscriber passcode information, the parental control key, decryption keys, and subscription authorization data. All data which is passed to or from any functional block within decoder 32 is under the control of the microcontroller 74. Keystrokes and receiver channel tuning commands entered by the subscriber are sent to the decoder 32 which may cancel each keystroke, change the channel tuning command, update the receiver clock, or change the display.

The main functions of microcontroller 74 are to accept, store, and locate decryption keys. A unique code in the form of an individualized encrypted common audio key will be sent to the decoder 32 via the real time controller 10 and satellite link B. Embedded within the decoder permanent memory 70 there is a factory loaded individual identity code in the form of a subscriber unit signature key which is different from the decoder address code. The subscriber unit signature key and address code will be combined with the encrypted common audio key and will be processed by the microcontroller in a proprietary manner such that a common audio key will be derived. The common audio key and other program tag information will form the decryption key which is fed to the audio decryption circuit.

A data bus 88 links the decoder through a buffer circuit 90 to optional peripheral equipment which may be used for impulse pay-per-view return information, as described below. The decoder will not permit impulse pay-per-view activities without this optional equipment connected and operating.

Impulse pay-per-view programming is located on its own unique programming tier levels and additionally includes all other non-subscription viewing, that is, programs on tiers for which the subscriber is not registered. For each program viewed on an impulse pay-per-view basis, the decoder will store the program tag number, the day of the month and the time in hours and minutes when the program was purchased by the subscriber. This information is passed to the impulse pay-per-view data communications processor at the billing center, either by the telephone modem (on the day of the month set as the billing period when the real time controller requests a data dump from the decoder) or by a "smart card" which is essentially a programmable memory.

In the case of the "smart card," it is assumed that this card will be mailed to the subscriber with the billing for the previous month. When received, the card is inserted into the interface box (not shown) and transactions since the last insert are dumped into the smart card. The card is then returned to the billing center with the monthly payment and the smart card is processed to update the billing data in the business center computer 14.

Preview time is provided by the program originator for each program. This period can be from zero minutes to fifteen minutes, with fifteen seconds resolution for each individual program. Any subscriber who tunes into the program at any time has a maximum of five minutes previewing time. If the subscriber tunes away from the program, the decoder stores the time previewed and if the subscriber then tunes back during the program, his/her preview time is now limited to the original viewing time, less the time spent on the previous preview. The decoder can track 16 simultaneous preview programs at any one time.

Since the recording of all impulse pay-per-view programs is the same in all respects, the decoder stores every impulse pay-per-view usage by tag number, date of month, hour, and minute. Any repeat viewing of the same event (provided the tag number is changed) is also recorded in the same manner. This permits considerable flexibility to the system operator in restructuring and billing. It is assumed that on a preset date of each month, subscriber billing information would be updated. This is carried out by the previously described smart card or by telephone communication with the system operator.

In the latter case, a modem and a modem control circuit (not shown) are connected to buffer 90 to act as the impulse pay-per-view data link. On the preset billing date, the real time controller 10 commands the decoder 32 to pulse dial the billing center computer 14 to relay the previous period impulse pay-per-view activity to the billing center computer 14. The computer 14 will send out bills periodically to the subscriber.

Figure 3:
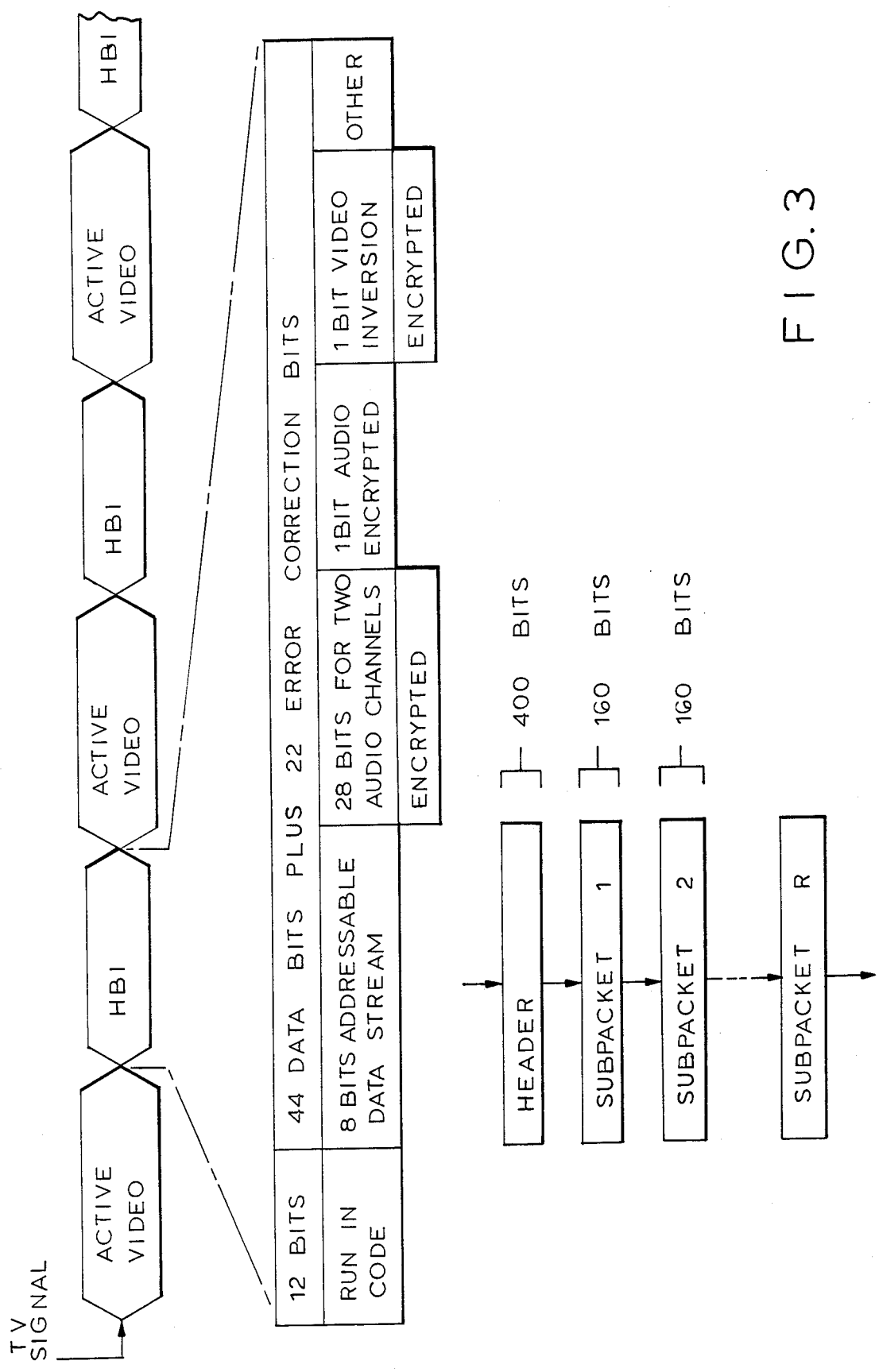
FIG. 3 illustrates the composite television signal used in the system of the present invention.

In order to understand the manner in which the addressable controller-decoder processes the received control data, it is necessary to understand the nature of the data signals which originate at the transmission end and are transferred via satellite to each of the addressable controller-decoders. The baseband signal format is illustrated in FIG. 3.

In a NTSC system, the active video portions occupy 51.4 microseconds of the video line using the NTSC composite format. The two audio channels and control data channel occupy a total of 9 microseconds during the horizontal blanking intervals. The video frame synchronization information and the zero level reference are transmitted using lines 1–9 in both fields during the vertical blanking intervals. Lines 10–21 of the vertical blanking intervals are reserved for other data services such as teletext.

The instantaneous data rate for audio data and control data is 7.15909 million bits per second which is twice the chrominance sub-carrier frequency. The transmission is inverted, synchronous mode. The data is non-returned to zero (NRZ) binary encoded.

Control data is sent to the addressable controller decoders in packetized form. A packet consists of a program header addressed to a group of receivers and many sub-packets which are addressable to specific receiver units within the group.

More specifically, as illustrated in FIG. 3, the composite television signal contains a plurality of signals on different frequencies. Each signal has active video portions and horizontal blanking intervals (HBI). Consecutive horizontal blanking intervals aggregate to form a bit stream which includes 16 bits of run-in code, 44 data bits, and 22 error correction bits and other bits. Of the 44 data bits, 8 bits are assigned to an addressable data stream which includes the program-related, sync and control information. Twenty-eight bits are assigned for the encrypted audio information for the two audio channels. One bit carries key bit information for synchronization of the decryptor. One bit carries an encrypted audio code designating whether the audio broadcast is in stereo or bilingual. One bit of the bit stream is dedicated to an encrypted video inversion signal. The remaining bits of the bit stream are used for other purposes.

The 8 bits of the addressable data stream accumulate to form a plurality of program headers and a group of addressable sub-packets associated with each header. The program header contains information for use by all addressable controller-decoders and describes the characteristics of the current program being broadcast on the selected frequency. Different headers are transmitted for each program on the frequency assigned to the program. The header contains a group address used to select one of 65,536 groups within the system addressing range. There may be as many as 256 individual controller-decoder units addressed by a single group address. Only those addressable controller-decoders that are part of the addressed group will have information addressed to it within this data stream.

The information contained within the data stream can be divided into three specific categories. These categories are program information, subscriber specific information, and subscriber global information.

Program information is contained entirely within the program header section. The program header is broadcast repetitiously at a rate of not less than three times per second during the period of the program broadcast. Each addressable sub-packet message is broadcast repetitiously for eight times. The message contained therein is considered as transmitted after broadcasting eight times.

The header packet contains two data blocks and each addressable sub-packet message contains a single data block. A 16 bit error detecting word is transmitted after each block. Thus, each data block is checked for transmitted error by a 16 bit cyclic redundancy check word called "checksum."

Figure 4:
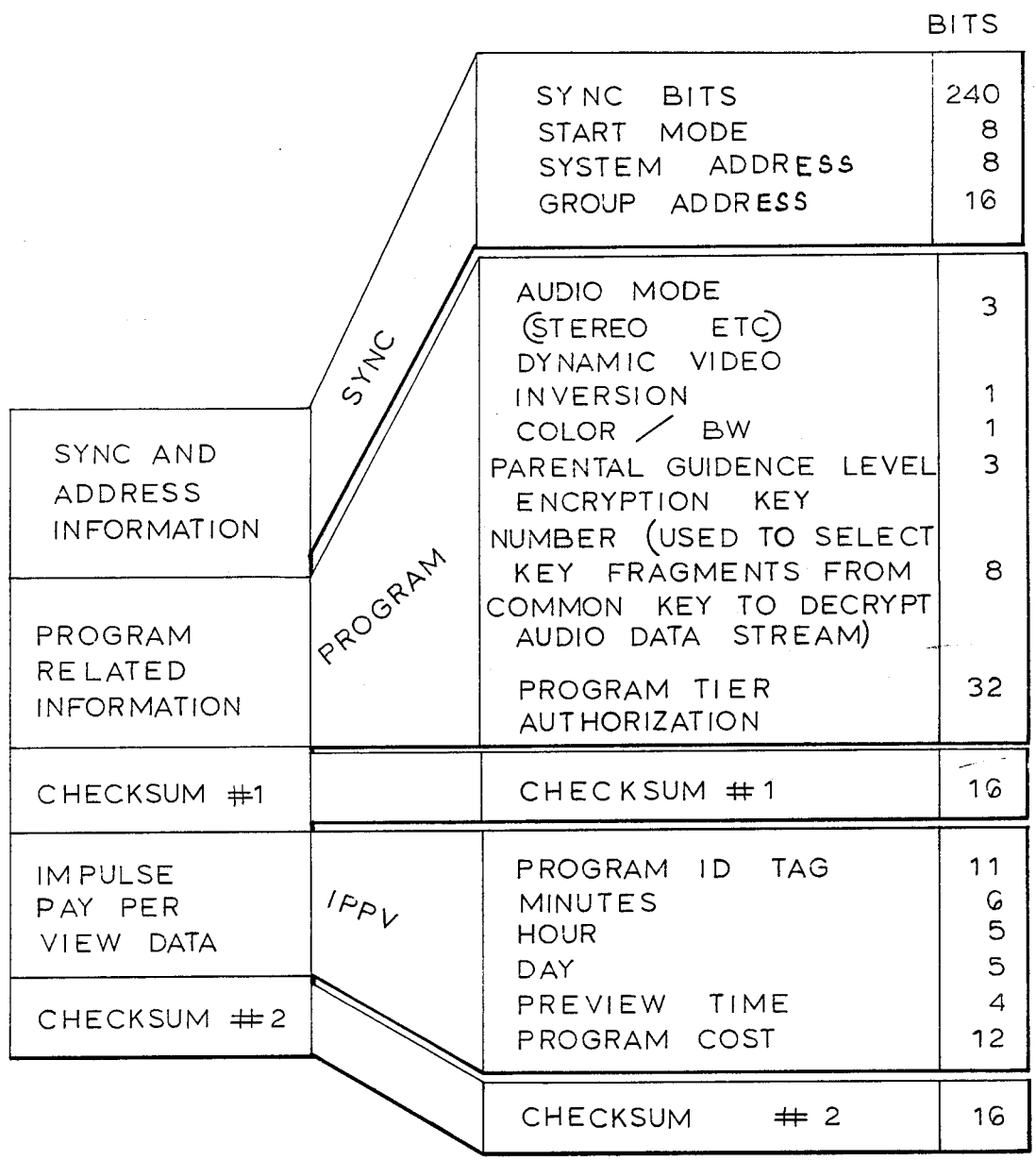
FIG. 4 illustrates the composition of the header portion of the data stream used in the system of the present invention.

As illustrated in FIG. 4, the header packet consists of a first block including synchronization words, subscriber group address information, and program related information, followed by the first error check word, CHECKSUM 1. The second block includes the impulse pay-per-view data and the second error check word CHECKSUM 2.

The synchronization words are words which provide an inter-record gap or spacing between successive data blocks. Synchronization words and run-in words are required between the data blocks. They are generated by the real time controller 10 and consist of 240 synchronous bits and an 8 bit start mode portion.

The subscriber group address defines a section of the addressable subscriber base to which subsequent messages will be sent. The group address will define approximately 65,000 groups of 256 subscribers each. This information is provided by the business center computer 14 as part of the subscriber specific information. The address information includes an 8 bit system address and a 16 bit group address.

The program related information includes a 3 bit audio mode portion which defines the type of audio being sent. The audio information can be sent in stereo, where each audio channel contains one-half of the program, in monaural where both channels contain the identical information, or by bilingually where each of the audio channels carries separate information, in one language on one channel and in another language on the other channel.

The next portion is a dynamic video inversion bit which is used to describe the video inversion mode of operation. This information is communicated by the studio control computer 12 and may be altered by the head end operator. Either the video is broadcast in its normal black-to-white relationship or the video signal is inverted.

The next 3 bits define the parental guidance level. These bits indicate one of eight program content levels for the current program. These levels are compared in the addressable controller-decoder to the user selected parental control levels. The parental guidance level is communicated by the studio control computer 12 and may be altered by the head end operator.

The next 8 bits define the encryption key number. This number is used to select key fragments from the encrypted common audio key such that the addressable controller-decoder can assemble the necessary decryption key to decrypt the audio data stream. The common audio key is transmitted in encrypted form in an addressable sub-packet.

The last 32 bits of the first block of information in the header packet define the program tier authorization. The program tier authorization information indicates to the addressable controller-decoder the programming tier upon which the selected program appears.

The second block of the header packet contains information concerning the impulse pay-per-view transaction data. The first 16 bits include a program identification tag which identifies the particular program being broadcast. The next 16 bits define the minute, hour, and day which the program identified by the program identification tag is being broadcast. The next 4 bits define the allowable preview time for the identified program. The last 4 bits define the program cost. The information in this block is used by the addressable controller-decoder to describe an impulse pay-per-view transaction when the subscriber enters the necessary commands into the keyboard requesting that a program be viewed on an impulse pay-per-view basis.

The subscriber specific information contained in the addressable sub-packets includes three different types of information, basic subscriber data, impulse pay-per-view data, and punch through data. This information is contained in several different possible message types, any one of which can be provided in an addressable sub-packet.

In general, as illustrated in FIG. 5, each sub-packet includes 160 bits with a field identifying the addressable controller-decoder address, a field identifying the message type number, a field to identify the decryption signature, and a field for the error detection CHECKSUM.

More specifically, the first 8 bits are devoted to the individual subscriber address which is really the 8 least significant bits of the subscriber address, the 16 most significant bits of the subscriber address being the group address contained in the header packet. The next 5 bits of the addressable sub-packet define the type of message type which is included in the addressable sub-packet. There are seven different message types, numbered 1–7, illustrated. However, other message types can be used as needed. Messages are transmitted in encrypted form.

The next 3 bits of each addressable sub-packet define the signature number. The signature number is a code used to select key fragments from the subscriber unit signature key stored in the subscriber unit memory to enable the addressable controller-decoder to decrypt the message contained in the addressable sub-packet. For further information concerning the signature number, the reader is referred to co-pending U.S. patent application Ser. No. 710,385 filed Mar. 11, 1985, referred to above.

The next 128 bits of each addressable sub-packet contain a message of the type defined by the message type indicator referred to above. The last 16 bits of the addressable sub-packet contain the error check word CHECKSUM.

As illustrated in FIG. 6A, message type 1 contains three portions, all of which include subscriber data. Thirty-two bits of message type 1 define an authorization bit map. This bit map is a 32 bit representation of the addressable controller-decoder subscription tier authorization. This field indicates to the addressable controller-decoder which programming tiers have been paid for by subscription. This information originates in the business center computer and is stored in the real time controller disc memory.

The next 80 bits of message type 1 define the common audio key necessary to decrypt the encrypted audio signals. The common audio key is in encrypted form because it is present in an encrypted message. Since each message is encrypted differently for each receiver unit, the encryption of the common audio key is individualized for each subscriber unit. Each subscriber unit decrypts the message to obtain the common audio key through the use of its subscriber unit signature key stored in its memory at the factory. For further details concerning the common audio key and the use thereof, the reader is referred to co-pending U.S. patent application Ser. No. 665,114 filed Oct. 26, 1984, referred to above.

The last 6 bits of message type 1 are devoted to a field which defines the "home" channel which the terminal receiver will tune to when the decoder is in the off mode. The home channel number originates in the business center computer and is stored in the real time control disc memory.

Message type 2, as illustrated in FIG. 6B, contains subscriber impulse pay-per-view information. The first 32 bits of message type 2 define a blocking bit map which restricts all access to certain program tiers. This information originates in the business center computer and is stored in the real time controller disc memory as subscriber specific information. For more detailed information concerning the manner in which the blocking bit map is utilized, the reader is referred to co-pending U.S. patent application Ser. No. 710,466 filed Mar. 11, 1985.

In general, along with the authorization bit map memory, each addressable controller-decoder has a blocking bit map memory which will prevent the display of certain programming tiers which, while normally available for impulse pay-per-view transactions, have been designated by the subscriber as unsuitable for viewing by his/her household. For example, one of the programming tiers may contain sexually explicit movies which the subscriber does not wish to have his/her children view. Although the children may have knowledge of the subscriber's pass code which will normally initiate an impulse pay-per-view transaction, they will not be able to initiate same if that programming tier is designated as being blocked.

Normally, the subscriber, upon initiating the subscription, will inform the system operator of which programming tiers are to be blocked. The system operator, through the real time controller, will then advise the subscribers' addressable controller-decoder of same by providing the necessary blocking bit map. The blocking bit map can only be changed by the system operator and will normally only be changed upon communication from the subscriber, such as written authorization to alter the blocking pattern. The blocking bit map is under the control of the system operator and can be changed at any time through the real time controller.

The next 28 bits of message type 2 are used for addressable controller-decoders having telephone communication capability. These bits define the day, hour, and minute of the month when the addressed subscriber unit will instruct the auto dial accessory to call the business center computer. This information originates in the business center computer and is stored in the real time controller disc memory as subscriber specific information. The next 16 bits of message type 2 define the credit/debit value for the impulse pay-per-view transaction. This number defines the amount which the viewer must pay for the privilege of viewing the program involved in the impulse pay-per-view transaction.

The transaction number, defined in the next 8 bits of the message, indicates one of 256 transaction numbers and is implemented for each new impulse pay-per-view transaction. This precludes the possibility of a double credit or debit being implemented by the addressable controller-decoder in the case of two or more broadcasts of the same program. This information originates in the business center computer.

The next 16 bits define the telephone password and are used for addressable controller-decoders having telephone communications capability. This word is used to validate a telephone response from the business center computer after an auto dial sequence has been completed. This field originates in the real time controller and may not be accessed by the head end operator.

The next 16 bits of this message contain the credit card password. This field is stored and used by those addressable controller-decoders equipped with an electronic credit card option. The password is used to validate the insertion of the correct electronic credit card (Smart Card) each time one is inserted into the unit. The impulse pay-per-view data transfer will not be allowed unless this validation process has successfully been completed. This field originates in the real time controller and may not be accessed by the head end operator.

The last 16 bits of message type 2 are devoted to an overflow call-in level. This data tells the addressable controller-decoder when to call the business center computer if the call at the previously designated call-in time has not been completed, either because the subscriber's telephone line is inoperable or is in use at the designated call-in time.

Message type 3 is illustrated in FIG. 6C. This message type contains additional impulse pay-per-view telephone data. The first 64 bits thereof define the call-in telephone number. The next 64 bits thereof define an alternate call-in telephone number in case the previously designated telephone number is busy at the designated call-in time.

FIG. 6D illustrates message type 4. Message type 4 contains global data, that is, data which is sent in an addressable sub-packet having a global address which contains control information applicable to all addressable controller-decoders within the group defined by the header packet. Message type 4 contains 128 bits which define an 8 channel reassignment table. The addressable controller-decoder uses the information contained in this table to alter the channel tuning characteristics of the receiver.

When a user enters a channel number into the receiver, the addressable controller-decoder scans the channel reassignment table. If a match is found between the channel entered and the in entry of the table, the out entry is passed to the receiver in its place. This feature is meant to facilitate the dynamic reassignment of transponder frequencies with transparency to the users when required. It is employed, for instance, when a particular transponder in satellite B is malfunctioning such that a program can be received by means of a transponder on a different frequency. This information originates with the head end operator only and is stored in one table in the real time controller. This data is common to all subscribers and, as indicated before, is situated in a message which is addressed globally.

FIG. 6E depicts message type 5. Message type 5 encompasses 128 bits and functions the same as message type 4 for an additional 8 RF channels. This information originates with the head end operator also and would be used in conjunction with a message type 4 and only when more than 8 RF channels required reassignment. This message is also addressed globally.

Message type 6, as illustrated in FIG. 6F, contains both punch-through data and global data. The use of this message type creates an immediate punch-through into the data stream and forces a new packet header for this one message alone. By punched-through data, it is meant that the data in the data stream is immediately routed through the addressable controller-decoder, without processing, to a selected one of decoder peripheral devices, one of which is the receiver, which, in turn, process and/or display the data.

The first 32 bits of message type 6 provide information for the direct control of the 4 bit, 7 segment display on the receiver. When enabled, data in this field will be displayed on the receiver display. Each bit is mapped to one LED segment. This permits all displays to, for example, display the same time.

The next 16 bits of message type 6 relate to the status of the individual addressable controller-decoder and, in particular, to the control and reset functions thereof. Each bit in this field is used to reset a certain function of the addressable controller-decoder. For example, one bit may reset the addressable controller-decoder flags such as the addressable controller-decoder tamper flag. Another bit may be used to reset the user's selected 4 digit passcode employed in parental control and impulse pay-per-view transactions.

The next 16 bits of message type 6 are devoted to audio threshold and data threshold information. The audio threshold byte is used to program the cut-out threshold for the audio data stream. The data threshold byte is used to program the cut-out threshold for the control data stream.

The next 30 bits of the message type 6 has to do with geographic blacking out of certain programming, normally sporting events and the like. Such programming is often broadcast with the restriction that it not be receivable in the geographic area where the event is taking place such that attendance at the sporting event will not be adversely affected. A detailed explanation of the manner in which the blackout system operates in the present invention is set forth in co-pending U.S. patent application Ser. No. 672,925 filed Nov. 19, 1984.

In general, each addressable controller-decoder, in addition to the authorization bit map memory and the blocking bit map memory has a blackout code memory and a geographic code memory. A message type 6 is addressed to all decoders within a given geographic area and each addressed decoder is supplied with a specific zip code for storage in its geographic code memory. The zip code is different for each geographic area.

The addressable controller-decoders are then globally addressed with a command for each decoder having a specific zip code stored in its geographic code memory to enter a specific blackout code in its blackout code memory. The blackout code is transmitted via message type 6, as is the zip code.

Each program is broadcast in conjunction with program tier authorization information in the associated header. Each receiving unit, upon receipt of a program, will compare the program tier authorization accompanying that program with the blackout code in its blackout code bit memory. If the transmitted tier information matches the blackout code in the blackout code bit memory, the receiver will be unable to display the program.

Since the zip codes and the blackout codes are down loaded into the addressable controller-decoders prior to the broadcast of a program to be blacked out in a specific geographic area, all of the addressable controller-decoders in the geographic area to be blacked out will black out the program simultaneously.

This is a great operational advantage. Normally, blacking out of a program within a specific geographic area requires each of the addressable controller-decoders within the geographic area to be addressed separately, an operation which may take ten minutes or more. This cannot be done prior to the broadcast of the program to be blacked out because the previous program normally will not be blacked out. On the other hand, if it is done after commencement of the program to be blacked out, some of the viewers will be able to receive at least a portion of the blackout program, causing irritation on the part of the viewers because they have been able to view a portion of the program before it is blacked out.

The 32 bits of message type 6 include a trap message bit map for peripheral interfacing. Each bit in this field is used to trap the associated message types. The addressable controller-decoder will take these messages and output them to peripheral devices for further processing, but will not take any further action. Message type 6 will, however, never be trapped.

FIG. 6G depicts a message type 7. Message type 7 comprises two 64 bit peripheral device signatures. These signatures define the output to which a particular trapped message should be routed for connection to a particular peripheral device. For example, a teletext display unit, for displaying stock market transaction information may be connected to a specific output of the addressable controller-decoder. Messages to be displayed by this peripheral device will be sent through a message type 6 and trapped in the addressable controller-decoder memory. A message type 7 will then be provided to instruct the addressable controller-decoder to route the previously trapped message to the teletext display peripheral.

Since the header portion of the data stream contains, among other information, program-related information such as the parental guidance level, the program tier authorization designation and impulse pay-per-view information for a particular channel or tier, a different header is broadcast for each channel or tier of programming. The addressable packets, on the other hand, each contain information usable only by particular addressed receiving units, such as program authorization information, the encrypted common audio key, program blocking information, etc. The addressed packets are broadcast on all channels or tiers simultaneously.

As illustrated in FIG. 7, a particular channel or tier of programming is selected in the tuning section of the receiver in response to the manipulation by the subscriber of the keyboard associated therewith. The keyboard signals are processed and received as an input to the microcomputer which controls the tuning section of the receiver. As described above, the microcomputer in the receiver exchanges information with the microcontroller in the decoder relating to, among other things, the channel or tier selected and the frequency to which the tuning section is tuned.

The tuned signal is transferred from the tuning section to the video control circuit of the decoder. The digital component of the tuned signal is separated from the video component. The video and audio control information and the encrypted audio signals are transferred to the appropriate circuits for processing. The header is then located and examined to obtain the group address. The group address is compared to the group address stored in the decoder memory. If the group addresses match, this indicates that at least one of the addressable packets in the data stream may contain information pertinent to the particular receiving unit.

The sync information, program-related information, and impulse pay-per-view information in the header (applicable to all receiving units) is captured and stored in the memory under control of the decoder microprocessor. The sync and video control information are used to reconstruct and process the video signals which, if cleared for display, are routed back to the receiver. If the receiving unit is not within the addressed group, the sequence ends, and the circuit awaits the next header.

If the receiving unit is within the addressed group, each addressable packet is monitored in turn. Information in any packet with a global address (applicable to all receiving units in the group) is captured and stored for future use.

When a packet is located with the address of the receiving unit, the type of message contained therein is noted and the decryption information in the packet, along with key information in a memory in the decoder are used to decrypt the message. The information in the message is then stored for use by the microcontroller. How and when the message information will be used depends upon the nature of the information.

For example, if the message is a command to set the authorization bit map or blocking bit maps (used to determine if the selected channel or tier is within the subscription and the display thereof is not blocked for some reason), the appropriate memories will be set. When a particular channel or tier is selected for viewing, the microcontroller will consult these memories and make a decision as to whether the selected channel or tier can be viewed without further action, whether an impulse pay-per-view transaction is required or whether this material cannot be displayed under any circumstances.

On the other hand, if the message contains instructions with respect to billing, such as the call-in time, this information will be stored until needed. At the appropriate time, the microcontroller will use this information to actuate the audio dial and modem circuits to report information to the system operator.

Accordingly, the header contains a unique combination of data--sync information, group address information, and program-related information. This data, when used in conjunction with information stored in the decoder memory, previously obtained from the addressable packets or, in the case of the subscriber signature key, stored in the memory in the factory, controls the reconstruction and display of the program, billing procedures and various other control functions. This data format and operating system constitutes a simple way of distributing program and control information in a secure manner.

It should now be appreciated that the present invention relates to a signal transmission system in which individual subscriber receiver units can be addressed and controlled on a real time basis. This is possible through the use of a data stream which is inserted into the horizontal blanking portions of the distributed composite television signal and which includes an encrypted audio portion, a header portion containing information applicable to the control of all of the receivers, and a plurality of addressable portions containing information for the control of specific subscriber units. Each of the addressable portions contains a message and information to enable the addressed subscriber unit to decrypt the message. The messages are alterable in real time by an in-line controller such that the system operator has direct control over the various functions of the addressed subscriber unit.

While only a single preferred embodiment of the present invention has been disclosed herein for purposes of illustration, it is obvious that many variations and modifications could be made thereto. It is intended to cover all of these variations and modifications which fall within the scope of the present invention as defined by the following claims:

We claim:

1. A method for transmitting data in a communications system of the type including broadcast signal originating means, a plurality of broadcast signal receiving means, each having an address, means for distributing the broadcast signal from the originating means to each of the receiving means, the method comprising the steps of generating a broadcast signal having active video signal portions, generating an audio signal portion, generating a data stream, inserting the audio signal portion and the data stream into the broadcast signal, between the active video portions thereof, the step of generating a data stream comprising the steps of generating a header portion comprising program related information applicable to all receiving means and address information common to each of a plurality of receiving means defining a group, generating separate control information portions individualized for each of the receiving means in the group, respectively, associating each of the individualized control information portions with address information specific to the receiving means in the group for which the control information portion is individualized, to form a plurality of addressable portions, one for each receiving means in the group, the header portion and the plurality of addressable portions in series as a unit comprising the data stream, the separate control information portions thus being transmitted to the respective receiving means in the group without repeatedly retransmitting the header portion with each addressable portion.

2. The method of claim 1, further comprising the steps of selecting an addressable portion and altering the control information portion therein on a real time basis.

3. The method of claim 1, further comprising the step of generating the program related information, the step of generating the program related information comprising the steps of generating information relating to the display of the active video portion of the broadcast signal and and inserting the display information into the header.

4. The method of claim 1, further comprising the step of generating the program related information, the step of generating the program related information comprising the steps of generating video signal synchronizing information and video signal decode information and inserting the video signal synchronizing information and video signal decoding information into the header.

5. The method of claim 1, wherein the step of generating the audio signal portion comprises the step of encrypting an audio signal.

6. The method of claim 1, further comprising the step of generating the program related information, the step of generating the program related information comprising the steps of generating audio signal decryption information and inserting the audio signal decryption information into the header.

7. The method of claim 1, further comprising the step of generating the program related information, the step of generating the program related information comprising the steps of generating program authorization information and inserting the program authorization information into the header.

8. The method of claim 1, wherein the system has an impulse pay-per-view capability and further comprising the step of generating the program related information, the step of generating the program related information comprising the steps of generating program identification and view cost information and inserting the program identification and view cost information into the header.

9. The method of claim 1, wherein each of the receiving means addresses includes a set of most significant bits and wherein all of the receiving means in the group have the same set of most signficant bits in their addresses, and wherein the step of generating the header portion comprises the steps of generating the set of most significant bits of the addresses of the receiving means in the group and inserting the set of most significant bits into the header.

10. The method of claim 1, wherein each of the receiving means addresses includes a set of least significant bits and further comprising the step of generating the set of least significant bits for each receiving means in the group to form the address information specific to the receiving means in the group.

11. The method of claim 1, wherein the step of separately generating a plurality of separate messages comprises the steps of generating audio signal decryption information, encrypting the audio signal decryption information with a key stored in the receiving means in the group to which the portion is addressed, generating information to enable the receiving means to which the portion is addressed to utilize the stored key to decrypt the audio signal decrypting information, the audio signal decryption information and the information to enable the decrypting of the audio decrypting information comprising the control information portion.

12. The method of claim 11, wherein the step of separately generating control information portions comprises the steps of generating a message, encrypting the message, generating information for decrypting the encrypted message, the encrypted message and information for decrypting same comprising the control information portion.

13. The method of claim 12, wherein each receiving means in the group has a stored unique decryption key comprising a plurality of fragments and wherein the step of generating information for decrypting the selected message comprises the steps of generating decryption key fragments selection information to permit designated key fragments to be selected from the stored key for decrypting the message, and the decryption key fragment selection information comprising the control information portion.

14. The method of claim 12, wherein the step of generating a message comprises the steps of generating an indication of the selected message type, the message type indication comprising the control information portion.

15. The method of claim 12, wherein each of the receiving means has telephone communications capability with the originating means and wherein the step of generating a message comprises the step of generating telephone communication instruction information.

16. The method of claim 15, wherein the step of generating telephone communication instruction information comprises the step of generating transaction data, credit data, call time data, and program value data.

17. The method of claim 15, wherein the step of generating telephone communication instruction information comprises the step of generating call-in telephone number data.

18. The method of claim 12, wherein the step of generating a message comprises the step of generating channel reassignment table data.

19. The method of claim 12, wherein each of the receiving units comprises a digital display and wherein the step of generating a message comprises the step of generating display control data.

20. The method of claim 12, wherein each of the receiving means has an erase and reset capability and wherein the step of generating a message comprises the step of generating erase and reset control function data.

21. The method of claim 12, wherein the step of generating a message comprises the step of generating audio and data threshold control data.

22. The method of claim 12, wherein the receiving means is used in conjunction with one or more peripheral devices for processing, recording, or displaying broadcast signal information and wherein the step of generating a message comprises the step of generating peripheral device data.

23. The method of claim 1, further comprising the step of presenting all non-addressed receiving means from processing the control information in an error containing addressed portion.

24. A method of processing data received by an addressable receiving means in a broadcast signal of the type including active video portions, an encrypted signal and a data stream, the data stream comprising a header portion including group address information in the form of the most signficant bits of the address of a group of receiving means and a first type of decryption key data and a plurality of addressable portions, the addressable portions including information individualized for and applicable to the control of only a single receiving means in the addressed group, the individualized information including receiving means address information in the form of the least significant bits of the address of the receiving means, an encrypted message including a second type of decryption key data, and message decryption data, the header portion and a series of addressable portions being transmitted as a unit such that the header portion is not repeatedly retransmitted with each addressable portion, the method comprising the steps of:
  (a) determining whether the group address information matches the most significant bits of the address of the receiving means;
  (b) processing the information in the header portion to obtain the decryption key data of the first type;
  (c) if the group address information matches the most signficant bits of the address of the receiving means, testing each addressable portion in the unit, in sequence, to determine whether the receiving means information therein matches the least significant bits of the address of the receiving means; and, if a match is present,
  (d) processing the individualized information in the addressed portion to decrypt the encrypted data and therein the second type of decryption key data; and
  (e) using the first type of decryption key data and the second type of decryption key data to decrypt the encrypted signal.

25. A direct broadcast satellite communications system comprising broadcast signal originating means and a plurality of broadcast signal receiving means, each receiving means having an address comprising a set of most signficant bits and a set of least significant bits, said originating means comprising program processing means generating video signals and audio signals and means for generating real time signal control means, means for generating program related signals for all receiving means in a group having an address with a particular set of most significant bits, means for generating separate control signals for individual receiving means in the group having an address including a particular set of most significant bits, means for scrambling the video signals to form a broadcast signal, the audio signals, program related signals, control signals and address information comprising a data stream including a header portion comprising the program related information and a set of most significant bits common to the receiving means in a group and a plurality of addressable portions comprising control information individualized for a particular receiving means in the group and a set of least significant bits associated with the particular receiving means, the header portion addressable portions in series being inserted into the broadcast signal as a unit, so that the header portion need not be repeatedly retransmitted with each addressable portion, means for transmitting the broadcast signal, and wherein each of the receiving means comprises means for tuning said broadcast signals, an addressable controller-decoder means, said decoder means including means, effective when a broadcast signal is received including the header portion and an addressable portion with the address of the addressable controller-decoder means, for descrambling and separating said video signals, audio signals, control signals and program related information associated with said receiving means and for controlling said addressed receiving means to process and display the video signals and audio signals in accordance with the control signals and program related information.

26. The system of claim 25, wherein said control information comprises an encrypted message portion and a message decryption information portion, and wherein said addressable controller-decoder means comprises means for recognizing its address and means for decrypting the message when the set of least significant bits in its address is recognized.

27. The system of claim 26, wherein said addressable decoder-controller has telephone communications capability with said signal originating means and wherein said message contains instructions for telephone communication between the decoder and said originating means.

28. A receiving means having an address including a set of most significant bits and a set of least significant bits for use in a communications system of the type transmitting a signal comprising video and audio information for a program, a data stream comprising a header containing a most signficant bit portion designating a group of receiving units, sync information and program related information, and a plurality of addressable portions associated with the header, each containing a least significant bits portion, and information for the control of the particular addressed unit having the address matching the set of most significant bits in the header and the set of least significant bits in the addressed portion, the header and a series of addressable portions being inserted into the signal as a unit such that the header need not be repeatedly retransmitted with each addressable portion, the receiving unit comprising means for receiving the signal, means for selecting a program to be viewed, means for tuning the selected program, means for separating the data stream from the video and audio information, means for examining the header to determine if the receiving unit is within the group having an address including the set of most significant bits in the header, means for capturing and storing the information in the header, means actuated if the receiving unit is within the addressed group, for examining each addressed portion associated with the header to determine if the set of least significant bits of the address of the individual receiving unit match the set of least significant bits in the addressed portion, means for capturing and storing the control information in the addressed portion if the individual receiving unit address is present, and means for processing and displaying the video and audio information in accordance with the stored header and control information.

29. The receiving unit of claim 28, wherein said audio information is in encrypted form, said control information comprising audio decryption information and wherein said processing and displaying means comprises means for decrypting the audio information in accordance with the audio decryption information captured from an addressed portion addressed to the individual receiving unit.

30. The receiving unit of claim 28, wherein each of said addressed portions comprises a message and wherein said means for capturing and storing the control information comprises means for capturing the message.

31. The receiving unit of claim 30, wherein said message is transmitted in encrypted form and said addressed portion comprises information for decrypting the message and further comprising means for decrypting the message using the decrypting information in the addressed portion.

32. The receiving unit of claim 30, further comprising means for storing message decryption information and means for using the stored message decryption information and decryption information in said addressed portion to decrypt the message.

* * * * *